(12) United States Patent
Gottschalk et al.

(10) Patent No.: US 10,072,785 B2
(45) Date of Patent: Sep. 11, 2018

(54) CONDUIT CONNECTOR

(71) Applicant: NORMA GERMANY GMBH, Maintal (DE)

(72) Inventors: Rene Gottschalk, Schoeneck (DE); Annette Ries, Rodenbach (DE); Andreas Bauer, Obernburg (DE)

(73) Assignee: NORMA GERMANY GMBH, Maintal (DE)

( * ) Notice: Subject to any disclaimer, the term of this patent is extended or adjusted under 35 U.S.C. 154(b) by 44 days.

(21) Appl. No.: 15/503,198

(22) PCT Filed: Aug. 4, 2015

(86) PCT No.: PCT/EP2015/067979
§ 371 (c)(1),
(2) Date: Feb. 10, 2017

(87) PCT Pub. No.: WO2016/023798
PCT Pub. Date: Feb. 18, 2016

(65) Prior Publication Data
US 2017/0234472 A1    Aug. 17, 2017

(30) Foreign Application Priority Data
Aug. 13, 2014 (DE) .................. 10 2014 111 534

(51) Int. Cl.
| | | |
|---|---|---|
| *F16K 31/44* | (2006.01) | |
| *F16L 55/07* | (2006.01) | |
| *F01P 11/02* | (2006.01) | |

(52) U.S. Cl.
CPC .......... *F16L 55/07* (2013.01); *F01P 11/0276* (2013.01); *F16K 31/44* (2013.01)

(58) Field of Classification Search
CPC ........ F16L 55/07; F01P 11/0276; F16K 31/44
(Continued)

(56) References Cited

U.S. PATENT DOCUMENTS 2,516,825 A * 7/1950 Hejduk .................... F16K 1/52
251/122
2,649,273 A * 8/1953 Honegger ................. F16K 1/42
251/118
(Continued)

FOREIGN PATENT DOCUMENTS

| CN | 2181589 | 11/1994 |
|---|---|---|
| CN | 201021691 | 2/2008 |

(Continued)

OTHER PUBLICATIONS

German Office Action in counterpart Application No. DE 10 2014 111 534.1.
(Continued)

*Primary Examiner* — John Bastianelli
(74) *Attorney, Agent, or Firm* — Greenblum & Bernstein, P.L.C.

(57) ABSTRACT

A conduit connector (1) having a housing (2), which has a first connection geometry (3) that can be connected to a fluid conduit, and a second connection geometry (4) that can be connected to a counter-element, wherein the first connection geometry and the second connection geometry are connected by a through channel (6) in the housing and the housing has an outlet opening (7) and a closing element (10) is provided, wherein the closing element can be fixed in a first position, in which a connection between the outlet opening and the through channel is blocked, and the closing element is displaceable into a second position, in which the outlet opening is connected to the through channel.

13 Claims, 2 Drawing Sheets

(58) Field of Classification Search
USPC .................................................. 251/210, 126
See application file for complete search history.

(56) References Cited

U.S. PATENT DOCUMENTS

| | | | | |
|---|---|---|---|---|
| 3,110,320 | A | * | 11/1963 | Rosenberger ............. F01K 9/04 137/563 |
| 3,187,775 | A | * | 6/1965 | Pinnell ...................... F16K 1/52 137/625.3 |
| 4,108,134 | A | * | 8/1978 | Malec ................... B01D 35/157 123/196 R |
| 4,983,084 | A | | 1/1991 | Gray |
| 5,544,856 | A | * | 8/1996 | King ........................ F16K 3/24 251/122 |
| 6,588,725 | B1 | | 7/2003 | Winieski et al. |
| 2011/0215565 | A1 | | 9/2011 | Bauer et al. |

FOREIGN PATENT DOCUMENTS

| | | |
|---|---|---|
| CN | 201730917 | 2/2011 |
| DE | 1007588 | 5/1957 |
| DE | 69812414 | 8/2003 |
| DE | 102010015157 | 9/2011 |
| DE | 102011120628 | 6/2013 |
| FR | 2041861 | 2/1971 |
| GB | 2448418 | 10/2008 |
| WO | 01/02283 | 1/2001 |

OTHER PUBLICATIONS

China Office Action conducted in China counterpart Application No. CN 201580043193.1 (dated Apr. 2, 2018).

* cited by examiner

CONDUIT CONNECTOR

The invention relates to a conduit connector with a housing which has a first connecting geometry, which can be connected to a fluid conduit, and a second connecting geometry, which can be connected to a mating element, wherein the first connecting geometry and the second connecting geometry are connected by a through-channel in the housing and the housing has an outlet opening and a closure element is provided.

Such a conduit connector is known, for example, from DE 10 2010 015 157 A1.

Such a conduit connector is used multiple times in a fluid circuit, for example, a coolant circuit of a motor vehicle.

If the coolant has to be changed, the conduit connector is normally released from the mating element so that the coolant circuit is provided with an opening through which the coolant can flow out. It should, however, be noted in this case that the coolant outflow cannot be controlled in a targeted manner so that the mechanic and/or the surroundings are contaminated by coolant flowing out of the coolant circuit.

The object on which the invention is based is to improve the ease of maintenance of fluid-conducting conduit systems.

This object is achieved by a conduit connector of the above-mentioned type in that the closure element can be fixed in a first position in which a connection between the exclusion opening and the through-channel is shut off, and the closure element can be displaced into a second position in which the exclusion opening is connected to the through-channel.

With such a formation, a possibility can be provided in a fluid-conducting conduit system with which the fluid can be discharged out of the conduit system without having to detach a connection between the conduit connector and the mating element or the fluid line. This possibility is made available by the outlet opening. This outlet opening can be reliably closed off in a fluid-impervious manner because the closure element can be fixed in the first position in which it shuts off a connection between the outlet opening and the through-channel. The closure element can therefore only be released from this position under the action of forces to be applied from the outside. After release from the first position, the closure element can be displaced into the second position so that the fluid can be discharged out of the conduit system.

Preferably, of the parts closure element and housing, at least one has a web guided in the manner of a helical line and the other has a shape which interacts with the web. A type of screw connection therefore exists between the closure element and the housing. The closure element is rotated with respect to the housing and as a result moves along its rotational axis from the first position into the second position or during closing of the outlet opening correspondingly vice versa from the second position into the first position.

The closure element preferably has a torque engagement surface. The torque engagement surface can be formed, for example, as a hexagonal on which a mechanic can engage with a corresponding tool in order to rotate the closure element.

It is preferred in this case that the torque engagement surface is arranged on a projection which projects out of the housing independently of the position of the closure element in the housing. The mechanic can therefore then access the torque engagement surface if the closure element is located in the first position.

The closure element and the housing in the first position preferably have a latching connection to one another. The closure element is therefore reliably held in the first position and cannot be released from the first position as a result of vibrations such as occur, for example, in a motor vehicle. For release, on the contrary, forces from the outside must act on the closure element, which forces are able to overcome the holding action of the latching connection.

It is particularly preferred in this case that the latching connection acts in the rotational direction. If the closure element cannot rotate because the latching connection acts in the rotational direction, then it can also not move translationally along its rotational axis because a rotational movement is necessary for this purpose due to the web guided in the manner of a helical line. A latching connection in the rotational direction can have relatively weak dimensions so that excessive forces do not have to be applied when releasing the latching connection or during latching.

The closure element preferably has a longitudinal channel which is closed at one end. As a result, the mass of the closure element is kept small.

The closure element is preferably arranged in a closure element channel which has a circumferential wall, wherein the closure element has a ring seal which bears from the inside against the circumferential wall. The ring seal can be formed, for example, as an O-ring. It ensures the interruption of the connection between the through-channel and the outlet opening. Since the geometric ratios for the ring seal practically do not change during the movement of the closure element in the closure element channel, the ring seal can also not be accidently overpressed.

It is preferable in this case that the outlet opening discharges into the valve element channel and a bridge running parallel to the longitudinal axis of the valve element channel is provided which terminates flush with the circumferential wall and penetrates through the outlet opening. The bridge serves as a bearing surface for the ring seal during movement of the closure element in the housing out of the first position into the second position or vice versa. The risk is thus kept low that the ring seal is damaged when running past the outlet opening.

The closure element in the first position preferably bears against a bearing surface externally on the housing with a step. The bearing surface and the step jointly restrict the movement of the closure element into the housing.

It is preferred in this case that the bearing surface is surrounded by a ring wall. The risk of contamination of the bearing surface is thus kept low. The first position of the closure element in the housing can therefore be repeatedly reached with a high degree of reliability.

The closure element channel preferably has an end wall and the closure element projects with a portion through an opening in the end wall, wherein the portion has a smaller cross-section than a maximum dimension of the opening. A gap, through which the fluid can flow out of the through-channel into the outlet opening, correspondingly remains between the portion and the circumferential edge of the opening.

It is preferred in this case that the closure element has, at its end projecting into the housing, a cross-sectional enlargement which is larger than a smallest diameter of the opening. The cross-sectional enlargement then forms a retainer, i.e. the closure element cannot readily fall out of the housing or be removed therefrom.

The housing, at least in a contact region with the closure element, is preferably formed from a first material and the closure element, at least in the contact region, is formed from a second material, wherein the first material has a different hardness to the second material. The risk that the closure element and the housing damage one another is thus kept low.

In one particularly preferred configuration, it is provided that the housing has an outlet nozzle into which the outlet opening discharges. The outlet nozzle can on one hand conduct the fluid flowing out of the outlet opening. On the other hand, the outlet nozzle can be used to attach a hose through which the fluid can flow out of the fluid-conducting conduit system in order to steer it, for example, in a targeted manner into a collection vessel.

The invention is described below on the basis of a preferred exemplary embodiment in combination with the drawing. In the drawing.

Figure 1:
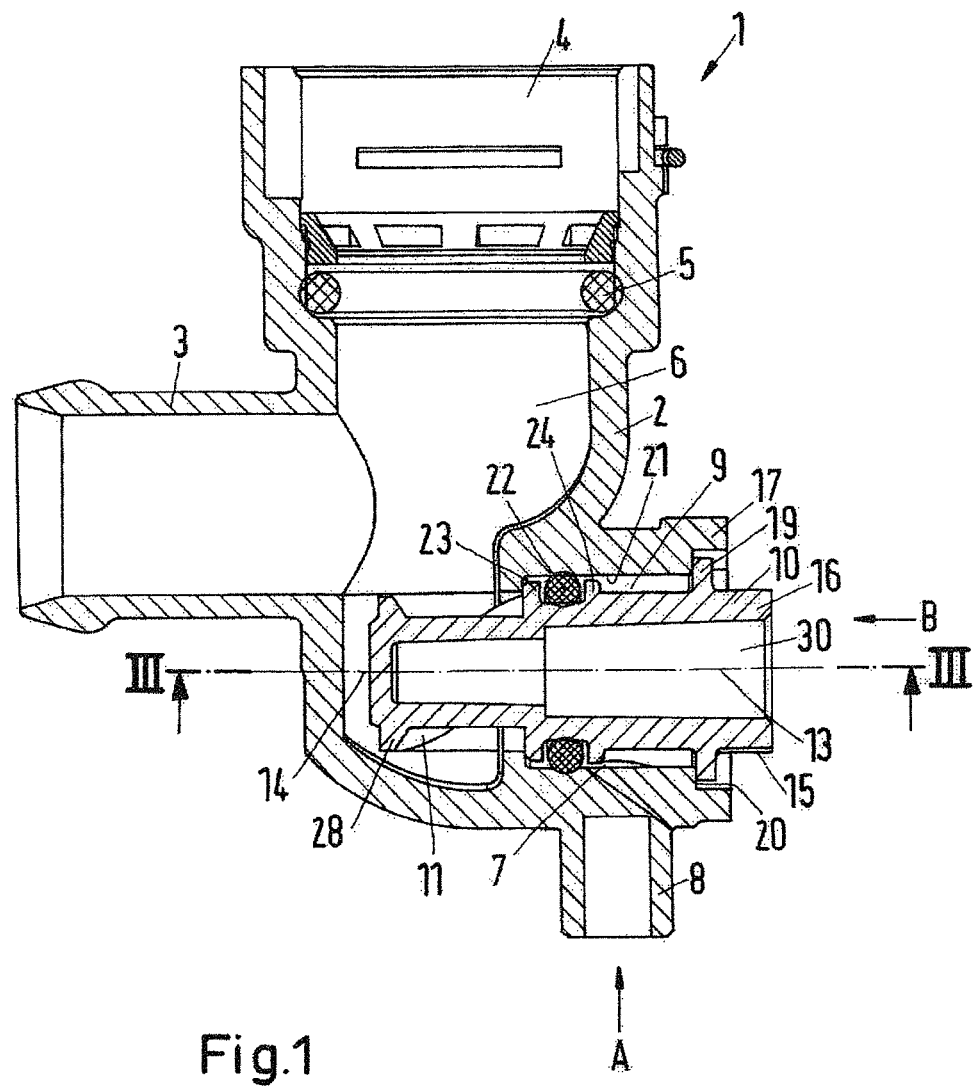
FIG. 1 shows a schematic sectional view of a conduit connector.

A conduit connector 1 has a housing 2 which has a first connecting geometry 3 and a second connecting geometry 4. First connecting geometry 3 normally serves to connect the conduit connector to a fluid conduit which is not represented here. Second connecting geometry 4 can be connected to a mating element. Here, a securing clip 5 is provided to which the mating element in second connecting geometry 4 can be secured. First connecting geometry 3 and second connecting geometry 4 are connected to one another by a through-channel 6.

Housing 2 has an outlet opening 7 which discharges in an outlet nozzle 8. Outlet nozzle 8 projects slightly beyond housing 2 so that, for example, a hose or the like can be pushed on.

Figure 3:
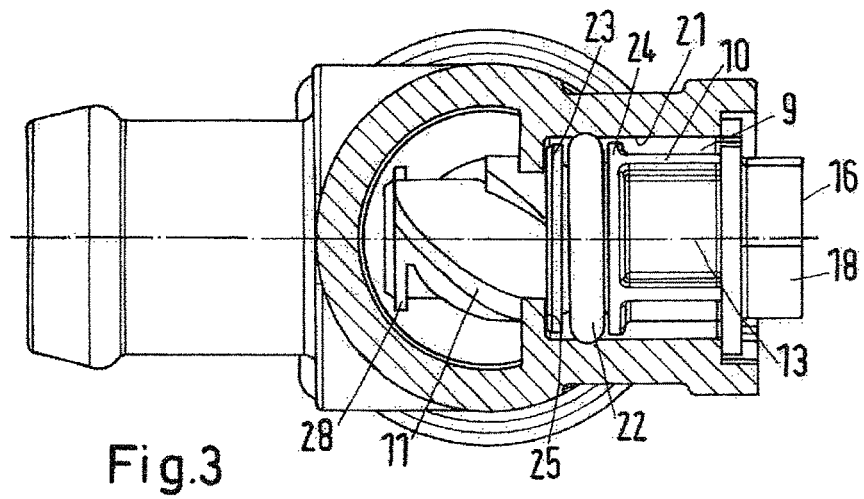
FIG. 3 shows a section III-II according to FIG. 1 with a closure element in a first position.

Housing 2 has a closure element channel 9 in which a closure element 10 is arranged. Closure element 10 can be fixed in a first position which is represented in FIGS. 1 and 3. In this position, closure element 10 shuts off a connection between outlet opening 7 and through-channel 6. Closure element 10 can be displaced into a second position in which it releases a connection between through-channel 6 and outlet opening 7, i.e. outlet opening 7 is connected to through-channel 6.

Closure element 10 has at least one, in the present case, however, a plurality of webs 11 guided in the manner of a helical line. Webs 11 run parallel to one another. Housing 2 has a shape in the form of opposite projections 12 which interact with webs 11. Webs 11 adjoin in each case projections 12. A displacement of closure element 9 with respect to housing 2 out of the first position into the second position or vice versa is correspondingly only possible if closure element 10 is rotated during this translational movement simultaneously about its longitudinal axis 13 which also corresponds to a longitudinal axis 14 of closure element channel 9.

In order to be able to bring about this rotation without difficulties, the closure element has a torque engagement surface 15 which is formed as an external hexagon in the present case. The torque engagement surface is arranged on a projection 16 of closure element 10 which projects out of housing 2 independently of the position of closure element 10 in housing 2. Torque engagement surface 15 is therefore also readily accessible in the first position of closure element 9 for a mechanic with a tool.

Closure element 10 and housing 2 can be latched to one another in the rotational direction. To this end, housing 2 has a ring wall 17 in which two opposite latching grooves 18 are formed. Closure element 10 has a step 19 which has tips pointing radially outwards (not represented) which can enter into latching grooves 18 if closure element 10 is rotated in closure element channel 9. If the tips enter into latching grooves 18, step 19 then bears against a bearing surface 20 on the outside of housing 2, which bearing surface 20 is surrounded by ring wall 17 and is thus largely protected from contamination.

Figure 4:
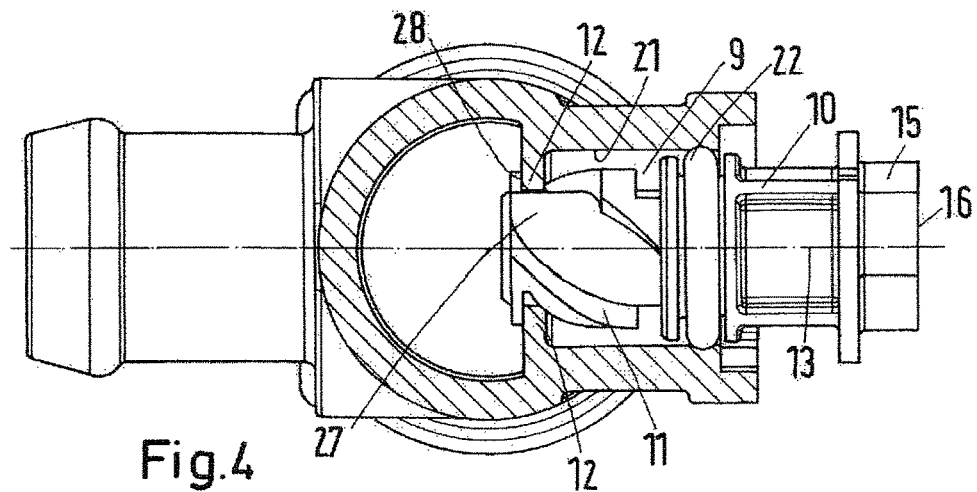
FIG. 4 shows a sectional view corresponding to FIG. 3 with the closure element in a second position and FIG. 5 shows a view B according to FIG. 1 without closure element.
Figure 5:
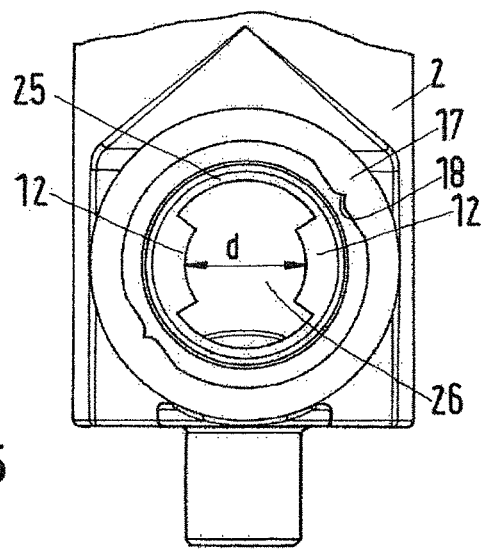

Closure element channel 9 has a circumferential wall 21. Closure element 10 has a ring seal 22, for example, in the form of an O-ring which bears from the inside against circumferential wall 21 independently of the position of closure element 10 in closure element channel 9. Ring seal 22 closes off or shuts off therefore in the first position represented in FIG. 3 a connection between through-channel 6 and outlet opening 7. At the same time, ring seal 22 seals through-channel 6 in this region to the outside. In the second position of closure element 10 represented in FIG. 4, ring seal 22 only seals to the outside, but releases a connection between through-channel 6 and outlet opening 7.

Ring seal 22 is held on closure element 10 between two circumferential projections 23, 24. Ring seal 22 can therefore only move to a limited extent or practically not at all on closure element 10 parallel to longitudinal axis 13 so that the position of ring seal 22 in closure element channel 9 is determined by the position of closure element 10.

Closure element channel 9 has an end wall 25 on which both projections 12 are also arranged. Said end wall 25 has an opening 26 through which the closure element projects with a portion 27 with a smaller diameter. Webs 11 guided in the manner of a helical line are arranged on portion 27. An adequate space, through which fluid can flow out of through-channel 6 into outlet opening 7 in the second position of closure element 10, thus always remains between the circumference of opening 26 and portion 27 as a result of the reduced diameter.

Closure element 10 has at its end projecting into housing 2 a cross-sectional enlargement 28 which is larger than a smallest diameter d of opening 26. Cross-sectional enlargement 28 is therefore formed as a retainer so that the closure element is held captively in housing 2.

Figure 2:
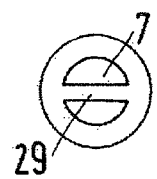
FIG. 2 shows a view A according to FIG. 1 in cut-out.

As is apparent in FIG. 2, a bridge 29 is provided in outlet opening 7. Bridge 29 runs parallel to longitudinal axis 14 of outlet channel 9 and terminates flush with circumferential wall 21. Bridge 29 forms a support for ring seal 22 if ring seal 22 moves beyond outlet opening 7. As a result, the risk of damage to ring seal 22 is kept low. Housing 2 and closure element 10 can be formed from materials with a different hardness. As a result, the risk of closure element 10 and housing 2 damaging one another is kept low.

It is, however, also possible to form closure element 10 and housing 2 with the same hardness and also from the same materials.

Closure element 10 has, as is apparent in FIG. 1, a longitudinal channel 30 which is closed at its end projecting into housing 2. The longitudinal channel reduces the weight of closure element 10.

The invention claimed is:

1. A conduit connector with a housing which has a first connecting geometry, which can be connected to a fluid conduit, and a second connecting geometry, which can be connected to a mating element, wherein the first connecting geometry and the second connecting geometry are connected by a through-channel in the housing and the housing has an outlet opening and a closure element is provided, wherein the closure element can be fixed in a first position in which a connection between the outlet opening and the through-channel is shut off, and the closure element can be displaced into a second position in which the outlet opening is connected to the through-channel wherein, of the parts closure element and housing, at least one has a web guided in the manner of a helical line and the other has a shape which interacts with the web, and wherein the closure element and the housing in the first position have a latching connection to one another.

2. The conduit connector as claimed in claim 1, wherein the closure element has a torque engagement surface.

3. The conduit connector as claimed in claim 2, wherein the torque engagement surface is arranged on a projection which projects out of the housing independently of the position of the closure element in the housing.

4. The conduit connector as claimed in claim 1, wherein the latching connection acts in the rotational direction.

5. The conduit connector as claimed in claim 1, wherein the closure element has a longitudinal channel which is closed at one end.

6. The conduit connector as claimed in claim 1, wherein the closure element is arranged in a closure element channel which has a circumferential wall, wherein the closure element has a ring seal which bears from the inside against the circumferential wall.

7. The conduit connector as claimed in claim 1, wherein the housing, at least in a contact region with the closure element, is formed from a first material and the closure element, at least in the contact region, is formed from a second material, wherein the first material has a different hardness to the second material.

8. The conduit connector as claimed in claim 1, wherein the housing has an outlet nozzle into which the outlet opening discharges.

9. A conduit connector with a housing which has a first connecting geometry, which can be connected to a fluid conduit, and a second connecting geometry, which can be connected to a mating element, wherein the first connecting geometry and the second connecting geometry are connected by a through-channel in the housing and the housing has an outlet opening and a closure element is provided, wherein the closure element can be fixed in a first position in which a connection between the outlet opening and the through-channel is shut off, and the closure element can be displaced into a second position in which the outlet opening is connected to the through-channel, wherein the closure element is arranged in a closure element channel which has a circumferential wall, wherein the closure element has a ring seal which bears from the inside against the circumferential wall, and wherein the outlet opening discharges into the closure element channel and a bridge running parallel to the longitudinal axis of the closure element channel is provided which terminates flush with the circumferential wall and penetrates through the outlet opening.

10. The conduit connector as claimed in claim 9, wherein the closure element in the first position is surrounded with a step on a bearing surface by a ring wall.

11. The conduit connector as claimed in claim 10, wherein the bearing surface is surrounded by a ring wall.

12. A conduit connector with a housing which has a first connecting geometry, which can be connected to a fluid conduit, and a second connecting geometry, which can be connected to a mating element, wherein the first connecting geometry and the second connecting geometry are connected by a through-channel in the housing and the housing has an outlet opening and a closure element is provided, wherein the closure element can be fixed in a first position in which a connection between the outlet opening and the through-channel is shut off, and the closure element can be displaced into a second position in which the outlet opening is connected to the through-channel, wherein the closure element is arranged in a closure element channel which has a circumferential wall, wherein the closure element has a ring seal which bears from the inside against the circumferential wall, and wherein the closure element channel has an end wall and the closure element projects with a portion through an opening in the end wall, wherein the portion has a smaller cross-section than a maximum dimension of the opening.

13. The conduit connector as claimed in claim 12, wherein the closure element has, at its end projecting into the housing, a cross-sectional enlargement which is larger than a smallest diameter of the opening.

* * * * *